(12) United States Patent
Cappeller et al.

(10) Patent No.: US 9,157,500 B2
(45) Date of Patent: Oct. 13, 2015

(54) GAS CYLINDER ACTUATOR WITH SAFETY SYSTEM FOR CONTROLLED EJECTION OF THE PISTON STEM

(75) Inventors: Augusto Cappeller, Bassano del Grappa (IT); Massimo Fiorese, Bassano del Grappa (IT); Daniel Fantinato, Bassano del Grappa (IT)

(73) Assignee: SPECIAL SPRINGS S.R.L., Rosa' (IT)

( * ) Notice: Subject to any disclaimer, the term of this patent is extended or adjusted under 35 U.S.C. 154(b) by 905 days.

(21) Appl. No.: 13/138,882

(22) PCT Filed: Apr. 15, 2010

(86) PCT No.: PCT/EP2010/054982
§ 371 (c)(1),
(2), (4) Date: Oct. 17, 2011

(87) PCT Pub. No.: WO2010/121946
PCT Pub. Date: Oct. 28, 2010

(65) Prior Publication Data
US 2012/0042770 A1    Feb. 23, 2012

(30) Foreign Application Priority Data

Apr. 21, 2009   (IT) .............................. PD2009A0100

(51) Int. Cl.
| F16J 1/02 | (2006.01) |
| F16F 9/02 | (2006.01) |
| B21D 24/02 | (2006.01) |
| B21D 55/00 | (2006.01) |
| F16F 9/32 | (2006.01) |

(52) U.S. Cl.
CPC .............. *F16F 9/0218* (2013.01); *B21D 24/02* (2013.01); *B21D 55/00* (2013.01); *F16F 9/3242* (2013.01); *F16F 2230/24* (2013.01)

(58) Field of Classification Search
USPC .............. 91/23, 399; 188/371, 376; 92/169.1, 92/165 R, 168, 167, 166, 162 R
See application file for complete search history.

(56) References Cited

U.S. PATENT DOCUMENTS

| 5,485,987 A | 1/1996 | Jobelius et al. |
| 6,086,059 A * | 7/2000 | Runesson et al. .......... 267/64.11 |
| 6,431,332 B1 * | 8/2002 | Phelizot ........................ 188/376 |
| 6,997,102 B2 * | 2/2006 | Fischass ...................... 92/169.1 |

FOREIGN PATENT DOCUMENTS

EP    0 427 468 A1    5/1991

* cited by examiner

*Primary Examiner* — Edward Look
*Assistant Examiner* — Daniel Collins
(74) *Attorney, Agent, or Firm* — Modiano & Associati; Albert Josif; Daniel J. O'Byrne

(57) ABSTRACT

A gas cylinder actuator with a safety device for controlled ejection of the piston stem, which has, on the side of the region for fixing the head portion to the jacket, a region in low relief on the inner face of the jacket, designed to interrupt the seal provided selectively either by the gasket elements associated with the piston or by the gasket elements associated with the head portion, and normally operating against the inner face of the jacket, in case of separation of the head portion with an outward movement of the piston.

7 Claims, 4 Drawing Sheets

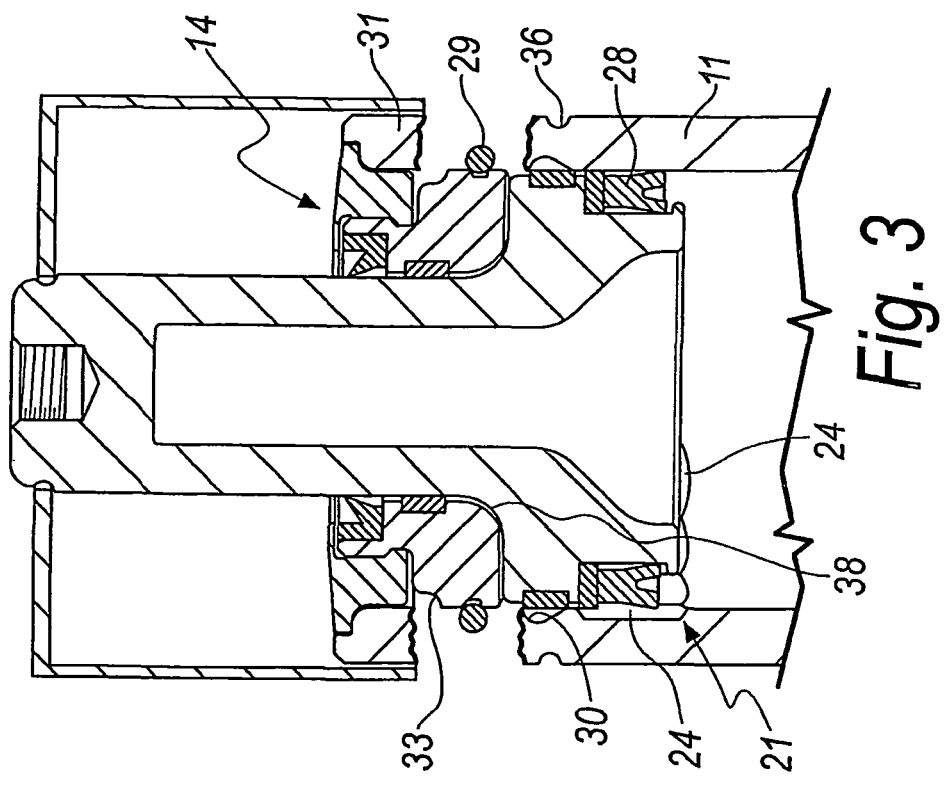
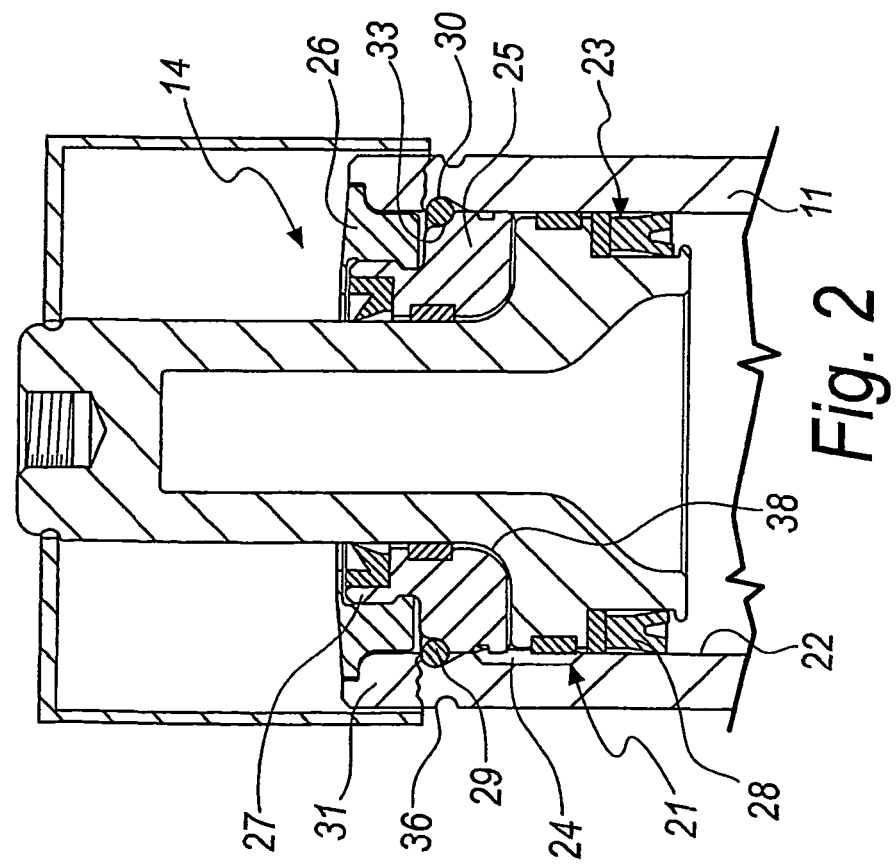

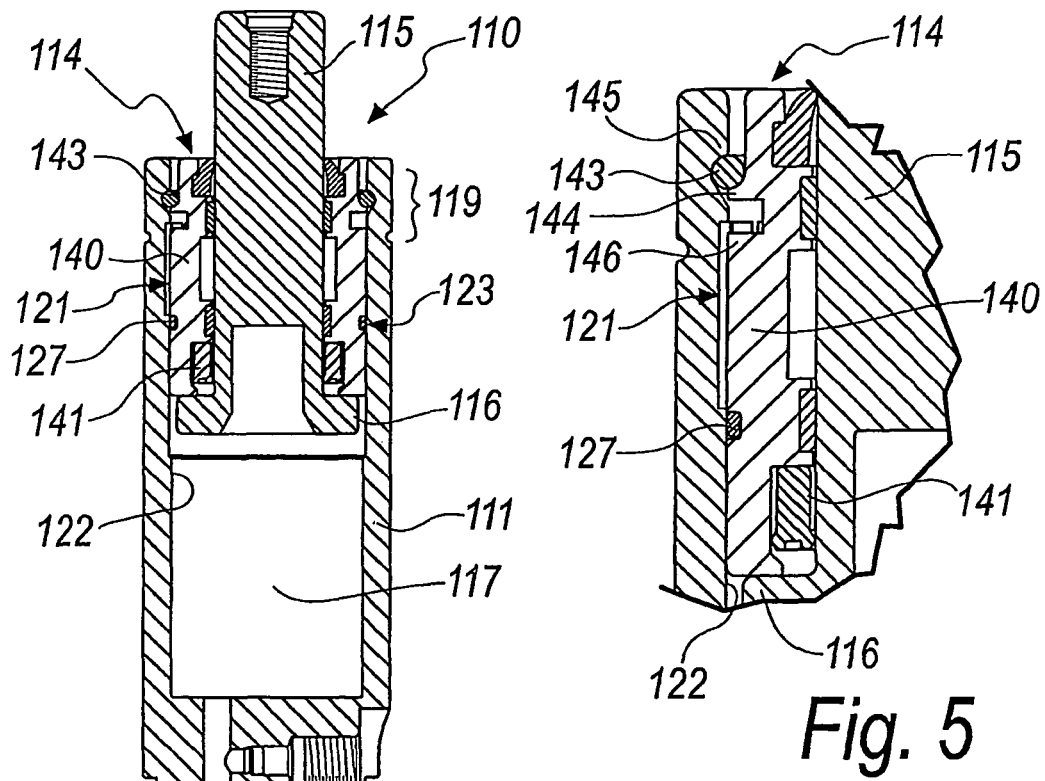
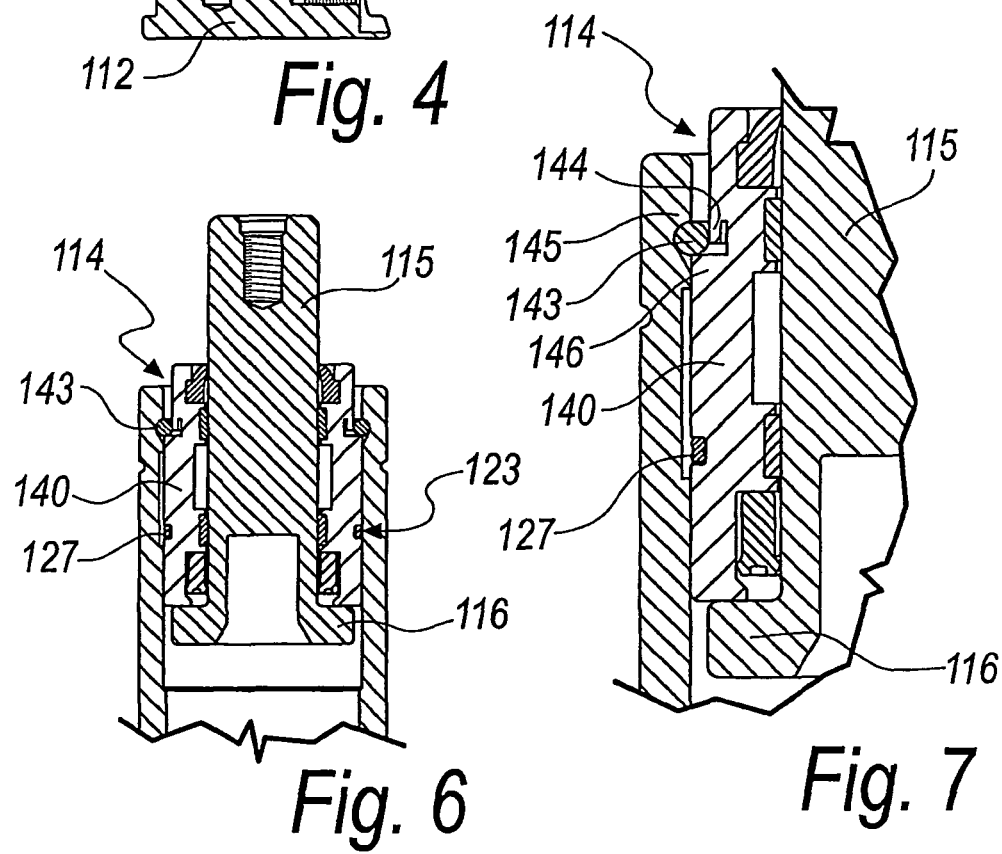
Fig. 4
Fig. 5
Fig. 6
Fig. 7

GAS CYLINDER ACTUATOR WITH SAFETY SYSTEM FOR CONTROLLED EJECTION OF THE PISTON STEM

The present invention relates to a gas cylinder actuator with safety device for controlled ejection of the piston stem.

BACKGROUND OF THE INVENTION

Gas cylinder actuators in general are formed by a tubular jacket for gas containment that is sealed hermetically at one end by a bottom provided with a gas filling valve, and at the opposite end by a head portion, which is provided with a hole for the passage of a stem with a piston, which performs a translational motion inside the jacket; the jacket, the bottom and the head portion form the stroke chamber for the piston, while the piston itself, with the jacket and the bottom, forms the gas compression and expansion chamber.

Such gas cylinder actuators are used typically, but not exclusively, also in situations, such as molds, molding presses and the like, in which they can be subjected to such operational conditions that they might be damaged; such damage can render the gas cylinder actuator itself unusable, with the need to replace it and interrupt the work of the machine or plant in which it is arranged to work, but it can also injure an operator who is in the vicinity, as in the case of an explosion caused by overpressure, or in the case of ejection of the stem due to breaking of the piston, caused by an unexpected and uncontrolled rising thrust caused by the pressurized gas.

Experience shows that the most critical condition is observed in the case in which a mold, on which a gas cylinder actuator operates, jams with the actuators in the compression configuration, and then the same mold is suddenly released, causing an unexpected return thrust of the piston stem, such as to break, as a consequence of an impact, either the head portion that retains the piston stem in the jacket or the piston stem.

In both cases, there is the great risk that the stem might be ejected with force, with great danger to any personnel that may be in the vicinity.

In order to obviate this drawback various means and devices for avoiding the uncontrolled ejection of the stem are currently known.

A first type of such devices is provided with an auxiliary safety shoulder, formed on the stem proximately to the piston, so that if there is a fracture between the piston and the stem in the junction region, the stem is retained inside the jacket thanks to the abutment of its auxiliary shoulder against a corresponding extraction-preventing shoulder provided on the head portion of the gas cylinder actuator.

In a second type of safety device for preventing the ejection of the stem, a predetermined part of the piston or of the stem is separated as a consequence of an impact of predefined strength, and this part damages the sealing gasket of the piston or of the stem, allowing the external discharge of the pressurized gas and preventing the violent and uncontrolled ejection of the stem.

Both of these types work to retain the stem inside the jacket.

Events could occur, however, for which the predefined breakages in the types mentioned above are not sufficient to ensure a discharge of the pressurized gas that is fast enough to prevent the gas cylinder actuator from yielding in other points in addition to the ones provided, or to prevent the piston stem from being ejected.

SUMMARY OF THE INVENTION

The aim of the present invention is to provide a gas cylinder actuator with a safety device for controlled ejection of the piston stem that is capable of obviating the limitations of currently known gas cylinder actuators with safety devices for overpressure.

Within this aim, an object of the invention is to provide a gas cylinder actuator that ensures the safe escape of the over-pressurized gas.

Another object of the invention is to devise a gas cylinder actuator in which any overpressure in the compression and expansion chamber never causes the uncontrolled ejection of the piston stem.

Another object of the invention is to devise a gas cylinder actuator whose performance is not inferior to similar gas cylinder actuators of the known type.

Another object of the invention is to devise a gas cylinder actuator that can be easily installed in machines and equipment of a known type without particular refinements.

Another object of the invention is to propose a gas cylinder actuator with a safety device for controlled ejection of the piston stem that is simple in structure and can be manufactured at low cost with known systems and technologies.

This aim and these and other objects that will become better apparent hereinafter are achieved by a gas cylinder actuator with a safety device for controlled ejection of the piston stem, which comprises a tubular jacket for gas containment, which is closed hermetically at one end by a bottom provided with a gas filling valve and at the opposite end by a head portion which is provided with a hole for the passage of a stem with a piston, the jacket, the bottom and the piston defining the gas compression and expansion chamber, said gas cylinder actuator being characterized in that it has, on the side of the region for fixing the head portion to the jacket, a region in low relief on the inner face of the jacket, designed to interrupt the seal provided selectively either by the gasket means associated with said piston or by the gasket means associated with said head portion, and normally operating against said inner face of the jacket, in case of separation of said head portion with an outward movement of said piston.

BRIEF DESCRIPTION OF THE DRAWINGS

Further characteristics and advantages of the invention will become better apparent from the following detailed description of three preferred but not exclusive embodiments of the gas cylinder actuator with a safety device for controlled ejection of the piston stem according to the invention, illustrated by way of non-limiting example in the accompanying drawings, wherein:

FIG. 2 is a sectional side view of a detail of the gas cylinder actuator according to the invention, in the configuration for complete extension of the piston stem, in the first embodiment thereof;

FIG. 3 is the same view as in FIG. 2 of the gas cylinder actuator according to the invention in the case of failure with breakage, in its first embodiment;

FIG. 4 is a sectional side view of the gas cylinder actuator according to the invention in a second embodiment thereof;

FIG. 5 is a view of a detail of FIG. 4;

FIG. 6 is the same side view as in FIG. 4 in a second operating configuration;

FIG. 7 is a view of a detail of FIG. 6;

DESCRIPTION OF THE PREFERRED EMBODIMENTS

Figure 1:
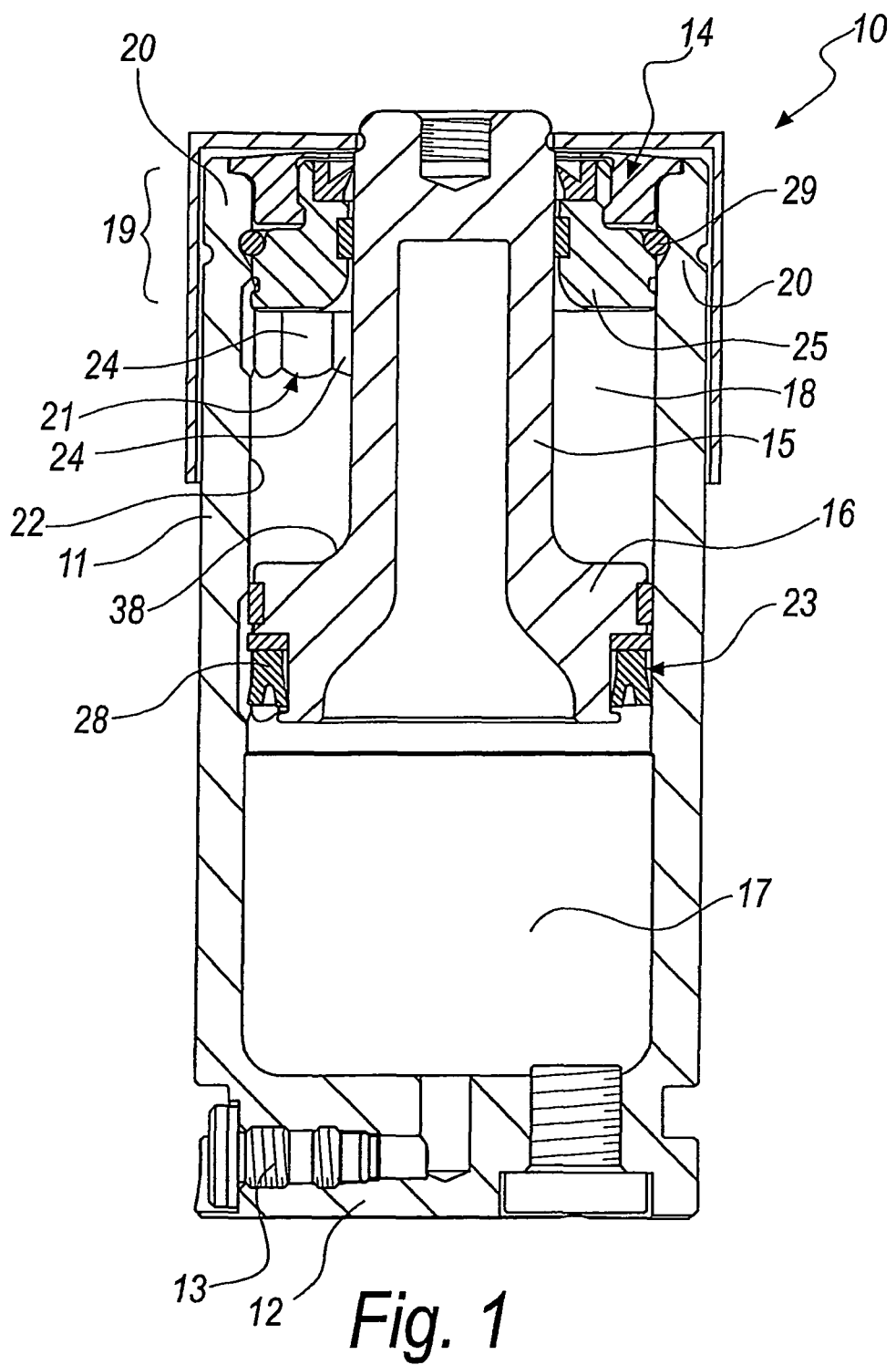
FIG. 1 is a sectional side view of a gas cylinder actuator according to the invention, in a first embodiment thereof.

With reference to the figures, a gas cylinder actuator with a safety device for controlled ejection of the piston stem is designated by the reference numeral 10.

The gas cylinder actuator 10 comprises a tubular jacket 11 for gas containment, which is closed hermetically at one end by a bottom 12 provided with a gas filling valve 13 and at the opposite end by a head portion 14, which is provided with a hole for the passage of a stem 15 with a piston 16.

The jacket 11, the bottom 12 and the piston 16 define the gas compression and expansion chamber 17, while the jacket 11, the piston 16 and the head portion 14 form the stroke chamber 18 for the piston 16 itself.

The gas cylinder actuator 10 is provided, on the side of the region 19 for fixing the head portion 14 to the jacket 11, with a region in low relief 21, on the inner face 22 of the jacket 11, which is designed to interrupt the seal provided by the gasket means 23 which are associated with the piston 16 and operate against the inner face 22 of the jacket 11.

The region 21 in low relief is adapted to allow the pressurized gas to escape from the compression and expansion chamber 17 before the piston 16 is ejected completely out of the jacket 11.

In this embodiment of the gas cylinder actuator 10 according to the invention, described herein by way of non-limiting example of the invention, the jacket 11 has a portion 20 with a reduced cross-section which according to the many tests performed is the portion most highly predisposed to break in case of an impact exceeding a predefined limit of the piston 16 with the head portion 14.

In this embodiment of the invention, the region in low relief 21 is provided with a series of recesses 24, arranged laterally on an arc of the same perimetric band of the inner face 22 of the jacket 11.

In an alternative embodiment, not shown, such region in low relief can be formed by a threaded portion of the inner surface of the jacket, or by an annular slot that lies on a perimeter of the inner face 22.

In this first embodiment of the invention, the head portion 14 is constituted by an annular gasket supporting body 25 and by a closure ring 26, to be screwed onto a corresponding threaded collar 27 of the annular body 25 so as to lock it.

The annular body 25 is retained in the jacket 11 by a locking ring 29, which is inserted so as to protrude in an annular slot 30 formed on the inner face 22 of the jacket 11 proximately to the end portion 31 of the jacket itself; the ring 29, on the opposite side, is pressed into a perimetric hollow 33 formed in the annular body 25.

The gasket means 23 are constituted, in this first embodiment, by a sealing ring 28 with a V-shaped lip.

The sealing ring 28, in the normal operation of the gas cylinder actuator 10, operates against the inner face 22 of the jacket 11.

The portion with reduced cross-section 20, in this example of embodiment of the invention, is located between the annular slot 30 for the locking ring 29 of the annular body 25 and an outer slot 36 provided on the outer surface of the jacket 11 at the inner annular slot 30.

The connecting portion 38 between the stem 15 and the piston 16 is provided with a relatively large radius of curvature, such that in case of impact between the piston 16 and the annular body 25, or in case of an unexpected load, the end portion 31 of the jacket 11 is the one that yields.

In this manner, the piston 16 continues its stroke outward, as shown in FIG. 3, propelled by the pressurized gas, until the sealing ring 28 reaches the recesses 24, as in FIG. 3.

At that moment, the gas escapes through the escape paths that are formed between the sealing ring 28 and the recesses 24, causing a sudden decrease of the speed of the piston 16, which is already slowed down by the energy dissipation caused by the impact with the annular body 25.

The piston 16 and the stem 15 that carries it have, if they exit completely from the jacket 11, a low speed which is not dangerous. The region in low relief 21 forms the device for controlled ejection of the piston stem that ensures the safety of the gas cylinder actuator 10 for situations with the risk of uncontrolled ejection of the stem 15 with the piston 16.

The gas cylinder actuator according to the invention is shown in a second embodiment thereof in FIGS. 4 to 7 and designated therein by the reference numeral 110.

In this second embodiment, which comprises the jacket 111, the bottom 112 with the filling valve 113, the head portion 114 and the chamber 117 for the gas, the head portion 114 is formed by a sleeve 140, which is provided axially with a hole for the passage of the stem 115 with the piston 116.

The sealing means 123 associated with the sleeve 140 are constituted by an inner sealing ring 141 for providing the dynamic seal with the stem 115 and by a static outer sealing ring 127, which is pressed against the inner face 122 of the jacket 111, as shown in FIG. 4 and in the detail of FIG. 5.

The sleeve 140 is coupled, in the fixing region 119, inside the jacket 111 by means of an extraction-preventing ring 143 that is interposed between two mutually opposite shoulders, a first shoulder 144, formed on the outside of the sleeve 140, and a second shoulder 145 on the inner face 122 of the jacket 111.

The region in low relief 121 interrupts the seal provided by the gasket means 123 associated with the sleeve 140, or by the static sealing ring 127 that operates against the inner face 122 of the jacket 111, if the first shoulder 144 yields, as a consequence of a sudden overload (for example, an uncontrolled return stroke of the stem 15), and the sleeve 140, propelled outward by the gas, rises, bringing the static sealing ring 127 to the region in low relief 121, as shown in FIG. 6 and in the detail of FIG. 7.

The first shoulder 144 is provided in a cantilever fashion, providing a preferred yielding point.

The sleeve 140 is provided with a third shoulder 146 having an outside diameter that is larger than the inside diameter of the extraction-preventing ring 143, designed to prevent the exit of the sleeve 140 from the jacket 11, obviously if the extraction-preventing ring 143 remains in its seat during the impact or malfunction in general.

The region in low relief 121 is formed by recesses or by an annular slot that lies on a perimeter of the inner face 122.

Figure 8:
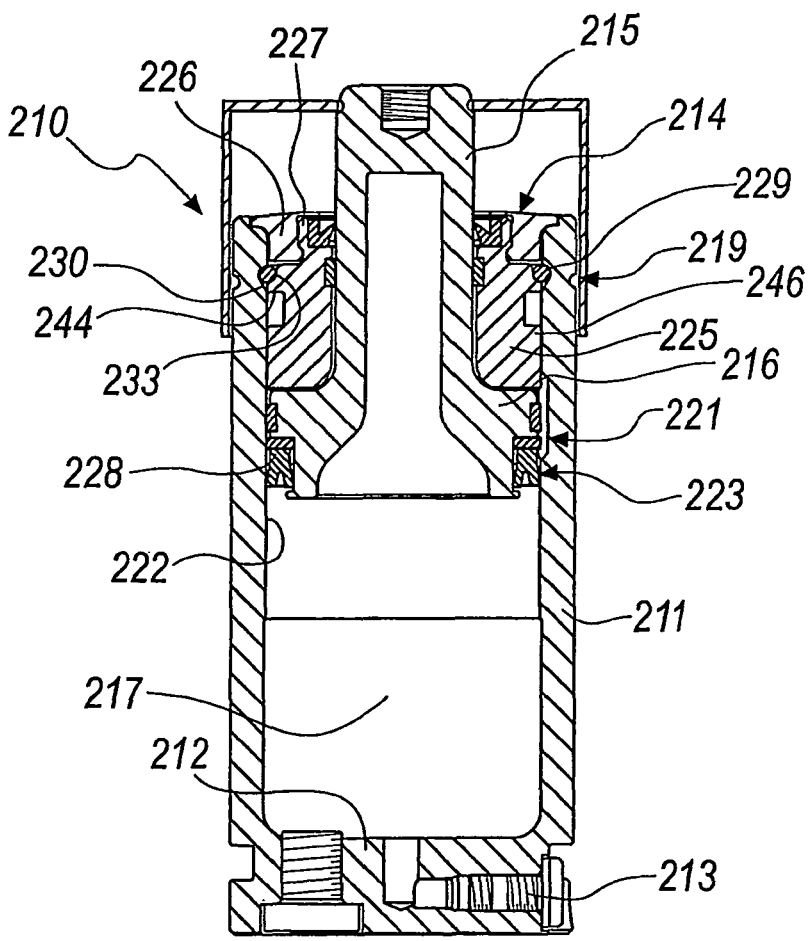
FIG. 8 is a sectional side view of a gas cylinder actuator according to the invention in a third embodiment thereof.
Figure 9:
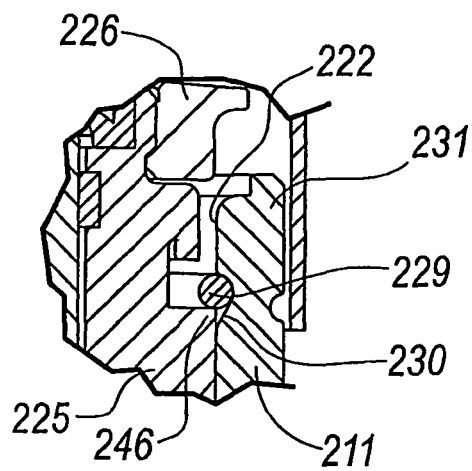
FIG. 9 is a view of a first detail of FIG. 8 in a second operating configuration.
Figure 10:
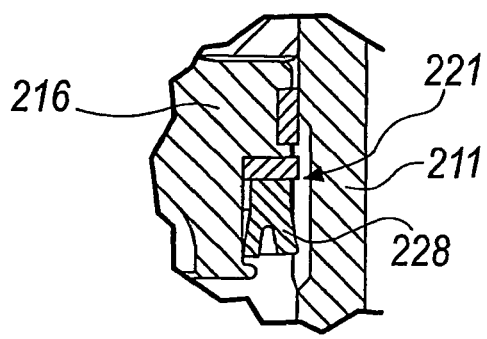
FIG. 10 is a view of a second detail of FIG. 8 in the same second operating configuration as the detail of FIG. 9.

The gas cylinder actuator according to the invention is illustrated in a third embodiment thereof in FIGS. 8 to 10 and designated therein by the reference numeral 210.

In this third embodiment, which comprises the jacket 211, the bottom 212 with the filling valve 213, the head portion 214 and the chamber 217 for the gas, the head portion 214 is formed by an annular gasket supporting body 225 and by a closure ring 226, to be screwed onto a corresponding threaded collar 227 of the annular body 225 so as to lock it.

The annular body 225 is retained in the jacket 211 by a locking ring 229, which is inserted so as to protrude, at the fixing region 219, in an annular slot 230 formed on the inner face 222 of the jacket 211 proximately to the end portion 231 of the jacket.

The ring 229, on the opposite side, is pressed into a perimetric hollow 233 formed in the annular body 225.

The gasket means 223 are constituted, in this third embodiment, by a sealing ring 228 with a V-shaped lip, which is fitted on the piston 216 carried by the stem 215.

The sealing ring 228 operates, during normal operation of the gas cylinder actuator 210, against the internal face 222 of the jacket 211.

A first shoulder 244 is provided in a cantilever fashion at the perimetric hollow 233 formed in the annular body 225.

A second shoulder 246, for limiting the stroke of the annular body 225, is formed below the first shoulder 244.

The region in low relief 221 interrupts the seal provided by the gasket means 223 associated with the piston 216, or by the sealing ring 228, that operates against the inner face 222 of the jacket 211, if the first shoulder 244 yields, as exemplified in FIG. 9, and the annular body 225, pushed by the piston 216 in turn propelled by the gas, rises, bringing the sealing ring 228 to the region in low relief 221, as shown in FIG. 10.

The first shoulder 244 is provided in a cantilever fashion, providing a preferred yielding point.

The second shoulder 246 has an outside diameter that is larger than the inside diameter of the locking ring 229, and is designed to prevent the escape of the annular body 225 from the jacket 211.

The region in low relief 221 is formed by recesses or by an annular slot that lies on a perimeter of the inner face 222.

In practice it has been found that the invention achieves the intended aim and objects.

In fact, the present invention provides a gas cylinder actuator 10 and 110 which, thanks to the region in low relief 21 and 121, ensures the safe venting of the pressurized gas, avoiding any uncontrolled ejection of the stem 15 and 115 and of the piston 16, 116 and 216.

Moreover, the invention provides a gas cylinder actuator in which any overload in the compression and expansion chamber 17 and 117 never causes the uncontrolled ejection of the piston 16 and 116, because in case of impact due to uncontrolled rise the piston 16 and 116 and the stem 15 and 115 are designed to resist, while the portion 20 with reduced cross-section, as well as the first shoulder 144 of the sleeve 140, is such as to yield and allow the piston or sleeve to continue the stroke until its sealing means 23 and 123 meet the corresponding region in low relief 21 and 121, causing the discharge of the gas and the sudden decrease of the ejection speed of the stem with the piston.

Moreover, the invention provides a gas cylinder actuator whose performance is not inferior to that of similar gas cylinder actuators of the known type.

Moreover, the invention provides a gas cylinder actuator that is easy to install in machines and equipment of a known type without particular refinement.

Finally, the invention provides a gas cylinder actuator with a safety device for controlled ejection of the piston stem that is structurally simple and can be manufactured at low cost with known systems and technologies.

The invention thus conceived is susceptible of numerous modifications and variations, all of which are within the scope of the appended claims; all the details may further be replaced with other technically equivalent elements.

In practice, the materials used, as well as the contingent shapes and dimensions, may be any according to requirements and to the state of the art.

The disclosures in Italian Patent Application No. PD2009A000100 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. A gas cylinder actuator with a safety device for controlled ejection of the piston stem, comprising a tubular jacket for gas containment, which is closed hermetically at one end by a bottom provided with a gas filling valve and at an opposite end by a head portion which is provided with a hole for the passage of a stem with a piston, said jacket, said bottom and said piston defining a gas compression and expansion chamber, said gas cylinder actuator having, on a side of a region for fixing the head portion to the jacket, a region in low relief on an inner face of the jacket, designed to interrupt the seal provided selectively either by the gasket means associated with said piston or by the gasket means associated with said head portion, and normally operating against said inner face of the jacket, in case of separation of said head portion with an outward movement of said piston, wherein said bottom is provided with a gas filling valve, and in that said head portion is constituted by an annular gasket supporting body and by a closure ring, to be screwed onto a corresponding threaded collar of the annular body so as to lock it, said annular body being retained in the jacket by a locking ring, which is inserted so as to protrude in an annular slot formed on the inner face of the jacket proximately to the end portion of said jacket, said ring, on the opposite side, being pressed into a perimetric hollow formed in the annular body, and wherein a weakened portion is located between the inner annular slot for the locking ring of the annular body and an external slot provided on the outer surface of the jacket at said inner annular slot.

2. The gas cylinder actuator according to claim 1, wherein said region in low relief is formed by at least one recess, arranged laterally on an arc of the same perimetric band of the inner face of the jacket.

3. The gas cylinder actuator according to claim 1, wherein said gasket means are constituted by a sealing ring with a V-shaped lip, which normally operates against the inner face of the jacket.

4. The gas cylinder actuator according to claim 1, wherein a connecting portion between the stem and the piston is provided with such a radius of curvature that in case of impact between the piston and the annular body the end portion of the jacket separates by breakage of the weakened portion.

5. A gas cylinder actuator with a safety device for controlled ejection of the piston stem, comprising a tubular jacket for gas containment, which is closed hermetically at one end by a bottom provided with a gas filling valve and at an opposite end by a head portion which is provided with a hole for the passage of a stem with a piston, said jacket, said bottom and said piston defining a gas compression and expansion chamber, said gas cylinder actuator having, on a side of a region for fixing the head portion to the jacket, a region in low relief on the inner face of the jacket, designed to interrupt the seal provided selectively either by the gasket means associated with said piston or by the gasket means associated with said head portion, and normally operating against said inner face of the jacket, in case of separation of said head portion with an outward movement of said piston, wherein said bottom is provided with a gas filling valve, and in that said head portion is formed by a sleeve, which is axially provided with a hole for the passage of the stem with the piston, said sleeve having an inner sealing ring for a dynamic seal with the stem, and a static outer sealing ring, which is pressed against the inner face of the jacket, said sleeve being coupled to the inside of said jacket by means of an extraction-preventing ring that is interposed between two mutually opposite shoulders, a first shoulder, formed on the outside of the sleeve, and a second shoulder on the inner face of the jacket, said region in low relief being adapted to interrupt the seal provided by the gasket means associated with the sleeve, or by the static sealing ring that operates against the inner face of the jacket, if the first shoulder yields and the sleeve, pushed outward by the gas, rises, moving the static sealing ring to the region in low relief.

6. The gas cylinder actuator according to claim 5, wherein said first shoulder is provided so as to cantilever, providing a preferred yielding point.

7. The gas cylinder actuator according to claim 6, wherein said region in low relief is provided by recesses or by an annular slot that lies on a perimeter of the inner face.

\* \* \* \* \*